US010740817B2

(12) United States Patent
Abuelsaad et al.

(10) Patent No.: US 10,740,817 B2
(45) Date of Patent: *Aug. 11, 2020

(54) PRICING DATA ACCORDING TO PROVENANCE-BASED USE IN A QUERY

(71) Applicant: International Business Machines Corporation, Armonk, NY (US)

(72) Inventors: Tamer E. Abuelsaad, Somers, NY (US); Gregory J. Boss, Saginaw, MI (US); John M. Ganci, Jr., Cary, NC (US); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 293 days.

This patent is subject to a terminal disclaimer.

(21) Appl. No.: 15/717,559

(22) Filed: Sep. 27, 2017

(65) Prior Publication Data

US 2018/0018727 A1   Jan. 18, 2018

Related U.S. Application Data

(63) Continuation of application No. 14/153,304, filed on Jan. 13, 2014, now Pat. No. 9,818,141.

(51) Int. Cl.
*G06Q 30/06* (2012.01)
*G06F 16/951* (2019.01)

(52) U.S. Cl.
CPC ....... *G06Q 30/0623* (2013.01); *G06F 16/951* (2019.01); *G06Q 30/0631* (2013.01)

(58) Field of Classification Search
None
See application file for complete search history.

(56) References Cited

U.S. PATENT DOCUMENTS

2013/0325870 A1\* 12/2013 Rouse et al. .................. 707/741

OTHER PUBLICATIONS

Quicklaw—Cost Effective Searching, LexisNexis Canada, available at: https://www.youtube.com/watch?v=7cbHrhm7kYc, Apr. 22, 2010 (Year: 2010).\*
Appendix P, 2017.

\* cited by examiner

*Primary Examiner* — Ming Shui
(74) *Attorney, Agent, or Firm* — Garg Law Firm, PLLC; Rakesh Garg; James Nock

(57) ABSTRACT

A method, system, and computer program product for pricing data according to provenance-based use in a query are provided in the illustrative embodiments. A set of data cubes is identified. A data cube in the set comprises a quantum of data configured for trading in exchange for a payment, the set being identified to participate in answering the query. A first portion of a price for performing the query is computed, which includes a price of a first data cube computed using a first set of provenance attributes and a first provenance-based pricing adjustment from a first pricing definition, the first data cube being included in the set. A confidence level of a result set of the query is computed. The set of data cubes, the first set of provenance attributes, the first portion of the price, and the confidence level are presented in a pricing preview of the query.

17 Claims, 6 Drawing Sheets

US 10,740,817 B2

PRICING DATA ACCORDING TO PROVENANCE-BASED USE IN A QUERY

TECHNICAL FIELD

The present invention relates generally to a method, system, and computer program product for selling quanta of data. More particularly, the present invention relates to a method, system, and computer program product for pricing data according to provenance-based use in a query.

BACKGROUND

A data store is a repository of data cubes from which a data cube or a portion thereof can be sold or otherwise traded. Generally, the data in a data store does not have to conform to any particular form or structure. Typically, data sourced from several different sources of different types is stored in a data store, and the different sources provide their data in varying formats, organized in different ways, and often in unstructured form. Several methods for querying data from one or more data stores are presently in use.

SUMMARY

The illustrative embodiments provide a method, system, and computer program product for pricing data according to provenance-based use in a query. An embodiment includes An embodiment includes a method for pricing data according to provenance-based use in a query. The embodiment identifies a set of data cubes, wherein a data cube in the set of data cubes comprises a quantum of data configured for trading in exchange for a payment, the set of data cubes being identified to participate in answering the query. The embodiment computes a first portion of a price for performing the query, wherein the first portion includes a price of a first data cube computed using a first set of provenance attributes and a first provenance-based pricing adjustment from a first pricing definition, the first data cube being included in the set of data cubes. The embodiment computes a confidence level of a result set of the query. The embodiment presents the set of data cubes, the first set of provenance attributes, the first portion of the price, and the confidence level in a pricing preview of the query.

Another embodiment includes a computer program product for pricing data according to provenance-based use in a query. The embodiment further includes one or more computer-readable tangible storage devices. The embodiment further includes program instructions, stored on at least one of the one or more storage devices, to identify a set of data cubes, wherein a data cube in the set of data cubes comprises a quantum of data configured for trading in exchange for a payment, the set of data cubes being identified to participate in answering the query. The embodiment further includes program instructions, stored on at least one of the one or more storage devices, to compute a first portion of a price for performing the query, wherein the first portion includes a price of a first data cube computed using a first set of provenance attributes and a first provenance-based pricing adjustment from a first pricing definition, the first data cube being included in the set of data cubes. The embodiment further includes program instructions, stored on at least one of the one or more storage devices, to compute a confidence level of a result set of the query. The embodiment further includes program instructions, stored on at least one of the one or more storage devices, to present the set of data cubes, the first set of provenance attributes, the first portion of the price, and the confidence level in a pricing preview of the query.

Another embodiment includes a computer system for pricing data according to provenance-based use in a query. The embodiment further includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to identify a set of data cubes, wherein a data cube in the set of data cubes comprises a quantum of data configured for trading in exchange for a payment, the set of data cubes being identified to participate in answering the query. The embodiment further includes program instructions, stored on at least one of the one or more storage devices for execution by at least one of the one or more processors via at least one of the one or more memories, to compute a first portion of a price for performing the query, wherein the first portion includes a price of a first data cube computed using a first set of provenance attributes and a first provenance-based pricing adjustment from a first pricing definition, the first data cube being included in the set of data cubes. The embodiment further includes program instructions, stored on at least one of the one or more storage devices for execution by at least one of the one or more processors via at least one of the one or more memories, to compute a confidence level of a result set of the query. The embodiment further includes program instructions, stored on at least one of the one or more storage devices for execution by at least one of the one or more processors via at least one of the one or more memories, to present the set of data cubes, the first set of provenance attributes, the first portion of the price, and the confidence level in a pricing preview of the query.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
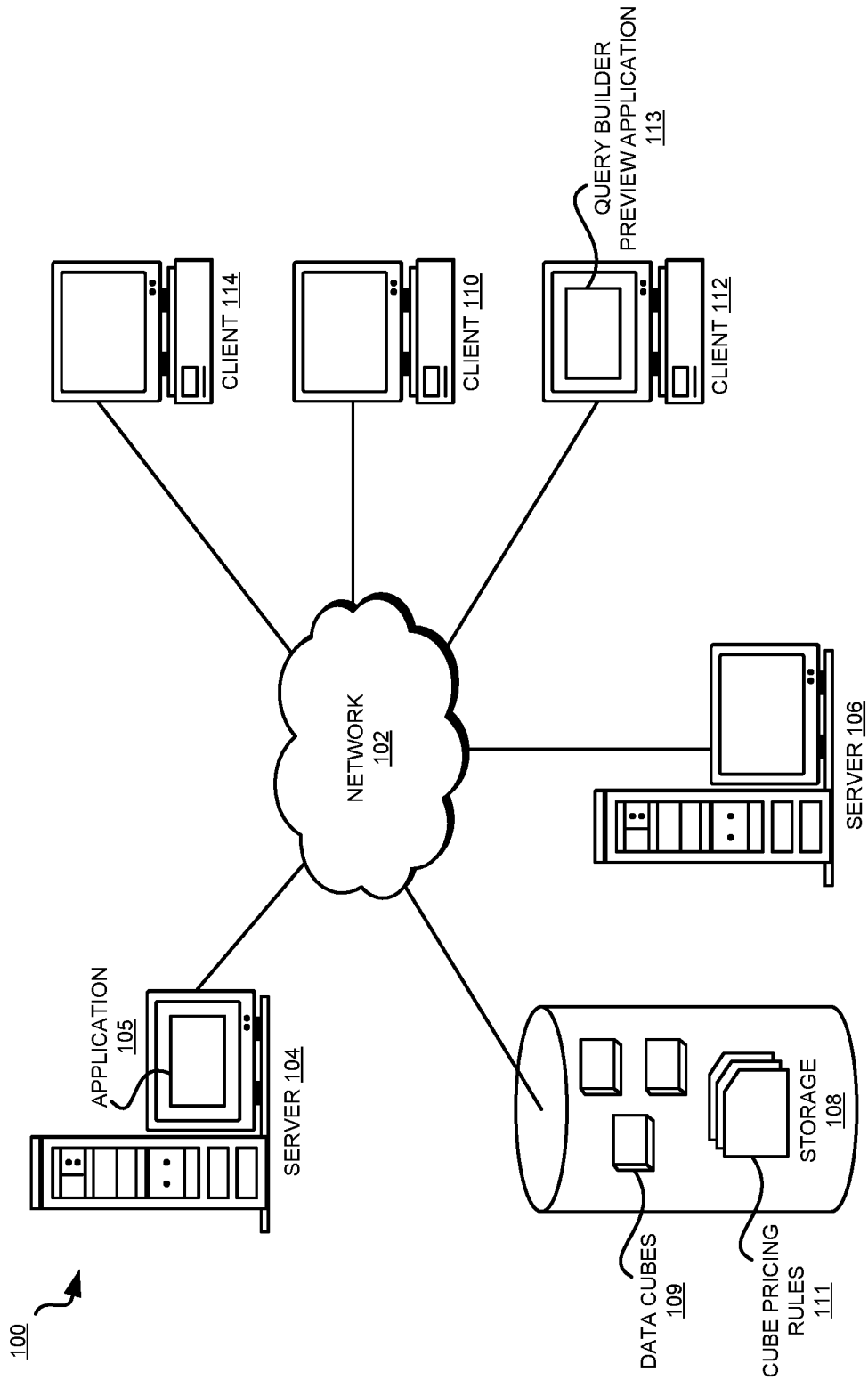
FIG. 1 depicts a block diagram of a network of data processing systems in which illustrative embodiments may be implemented.

A data cube is a quantum of data that can be sold, purchased, borrowed, installed, loaded, or otherwise used in a computation. Much like an application store contains applications, a data store according to the illustrative embodiments contains numerous data cubes.

In a manner similar to obtaining an application from an application store for use on a device, the illustrative embodiments contemplate that a user can obtain one or more data cubes to use in the user's query. For example, a user can use a shopping cart application to select data cubes from a data store. The user can then buy, borrow, lease, loan, download, install, or otherwise use the selected data cubes in the user's query in the manner of an embodiment.

Computing resources, such as processor time, memory, and storage space, are often billed according to their use. An amount of billing for a computing resource is usually proportional to an amount of time and the size of the resource used by a user.

The illustrative embodiments recognize that presently data is not sold or traded as data cubes, but in conjunction with some application or environment. For example, map data is sold as a bundle with a navigation application, financial data is sold in conjunction with a financial analysis application, as so on. The illustrative embodiments recognize that selling or trading data by bundling with an application restricts the utility of the data as well as the market for the data. For example, a user who wants to use certain map data must also buy or subscribe to a specific application to use the data.

The illustrative embodiments recognize that data is artificially tied to applications. The illustrative embodiments recognize that much of the data is, or can be, a generalized commodity, which can be traded independently from any trade involving applications or other restrictions.

The illustrative embodiments recognize that making data available for use, such as in a query, has a flexible value. The illustrative embodiments further recognize that unlike the billing for computing resources, the amount of data used, e.g., bytes, Megabytes, Gigabytes, or Terabytes delivered, is not an adequate indicator of the value of the data. Similarly, the period of the usage is also not an adequate indicator of the value of the data. Consequently, the illustrative embodiments recognize that the pricing of data cubes has to be use-related, such that the price a user pays for a data cube, or a part thereof, is related to the contribution of that data cube, or a part thereof, in the user's query. Even when generic data is available for purchase today, the pricing of that data is static, regardless of the contribution of the data to different users. Furthermore, where generic data can be purchased, a user has to pay first to purchase the data, in order to be able to determine the data's utility for the user's intended purpose.

The illustrative embodiments used to describe the invention generally address and solve the above-described problems and other problems related to trading in data. The illustrative embodiments provide a method, system, and computer program product for pricing data according to provenance-based use in a query.

Provenance of data (data provenance) is one or more attributes of the data that are useful in assessing the value of the data for a particular purpose. A non-exhaustive list of example provenance attributes of data includes a source or author, age, chain of control, reputation of the source or author, size, significance in a particular field of use, recognition or influence in a particular field of use, conclusions drawn or draw-able there from, and user opinion of the given data.

As an example, provenance of data can be determined from agents, processes, or activities that produced or modified that data prior to the intended use of the data. For example, a human or automated system may produce a document or an image. This same data may be modified or influenced, or possibly revised, as part of a process. The act of revising, quoting, or generating constitutes an activity that determines a provenance attribute of that document or image.

Provenance attributes of data can be represented as metadata attributes associated with the data. Furthermore, data provenance can be shallow or deep. Most data today is represented as shallow provenance with minimal metadata to describe the data. For example, medical data may only include the title, content, and creation date. Shallow provenance of presently available data is generally insufficient for assessing a level of trust or confidence that can be placed on that data.

Deep provenance according to an embodiment comprises a comparatively larger and more diverse set of provenance attributes, such that the deep provenance attributes are usable to assess a confidence level in a result obtained using the data. For example, medical data cube using deep data provenance may include additional metadata attributes such as original author, author email, contributing authors, ownership of the data cube, revision history of records in the cube, revision level of records in the cube, date published, date updated, one or more conclusions drawn from the records in the cube, an identification of a previous use in a field of use, identification of an influence of the cube in the field of use, whether any records in the cube have been refuted or retracted, user feedback on the cube, peer review status of the cube, and many other similarly purposed attributes. The attributes of deep data provenance according to an embodiment is usable to increase, decrease, or assess the trust and confidence levels when the data cube, or a portion thereof, participates in a particular use, such as in answering a query.

The provenance attributes described in this disclosure are not intended to be exhaustive of all possible provenance attributes usable in a deep provenance of data. Using this disclosure, and depending upon the contents of a particular data cube, a circumstance of a particular use, and numerous other implementation-specific factors, those of ordinary skill in the art will be able to conceive many other provenance attributes usable for a similar purpose, and the same are contemplated within the scope of the illustrative embodiments.

An embodiment allows a data source (seller) to define how they want to control the use of the data cube they contribute to a data store. The embodiment further allows the seller to define a set of provenance attributes of the entire cube or a portion thereof. The embodiment allows defining different provenance attributes for different portions of a given cube.

The embodiment further allows the seller to define certain pricing parameters to use when the data cube is selected for participating in a query. The embodiment further associates certain pricing parameters with certain provenance attributes. A pricing parameter associated with a provenance attribute is changeable as and when the value of the provenance attribute changes.

For example, an example provenance attribute may be the age of a portion of a given cube. The seller of the cube may wish to add a premium on a base price for using the portion, when the portion is newer than a threshold age, and is selected for use in a query. As the records in that portion get older than the threshold, the premium may be adjusted according to the age of the portion and depending on the data, because not all old data becomes less valuable with age.

As another example, an example provenance attribute may be a user feedback score of a portion of a given cube. The seller of the cube may wish to add a premium on a base price for using the portion, when the feedback score exceeds a threshold score at the time of selecting the portion for use in a query. As the feedback score changes, perhaps dropping below the threshold score, the premium may be adjusted according to the revised feedback score of the portion.

As a domain specific example, consider a cube containing data of a new drug trial for a pharmaceutical drug. The provenance attributes for such a cube will be different from, for example, a machine failure study related data cube or a software testing related data cube. For example, the new drug trial data cube may include provenance attributes such as date and time the cube was created (price of cube related to the age of the cube), drug trial date (price of cube related to the currency of the cube), drug trial sample size (price of cube related to the size of the cube), drug trial results, e.g., break down by age, gender, predispositions, etc., (price of cube related to the composition of the cube), lead researcher for the study (price of cube related to the recognition of the author in the field of study), revision level (price of cube related to the updating of the cube), drug side effects (price of cube related to a conclusion drawn the cube), symptoms treated (price of cube related to a different conclusion draw-able of the cube), illnesses treated (price of cube related to a conclusion drawn by others using the cube), and patents for drug (price of cube related to additional indirectly usable information in the cube).

Many other provenance attributes are configurable with changeable pricing parameters in this manner. For example, changing number of references made to the cube or a portion thereof, changes in contributing authors, changing number of records refuted, changing set of conclusions participated in, changing popularity for a particular use (e.g., a particular type of query or in a particular field of use), and changing size of data available in the cube, are some example changes in provenance attributes that can be used to change one or more pricing parameters associated with the cube or a portion thereof.

A seller of a cube can change a provenance attribute or a pricing parameter of a cube as needed. Additionally, an embodiment allows a change in a provenance attribute to be automatic according to a logic configuration, in response to a change in the contents of the data cube. An embodiment further allows a change in a pricing parameter to be automatic according to a logic configuration, in response to a change in a provenance attribute.

An embodiment receives a query from a user (buyer). The embodiment identifies a set of data cubes that include at least some data to qualify for participating in the query. Optionally, an embodiment eliminates, removes, or otherwise disqualifies zero or more data cubes from the set based on any pricing or use restrictions prescribed by the seller.

For example, a seller of a healthcare-related data cube may not wish for the cube to participate in a query where it becomes possible to identify an individual patient. Thus, even though a healthcare-related query can use the data cube, the data cube may be disqualified if the nature of the query or combining the data cube with another data cube in the query can lead to an individual's identification.

As another example, only a portion of a particular data cube may be suitable for participating in a query but the seller of the data cube may prohibit partial use of the data cube. These examples of data cube disqualification are not intended to be limiting on the illustrative embodiments. Specific circumstances can give rise to any number of reasons for disqualification of a data cube, and the same are contemplated within the scope of the illustrative embodiments, with the goal of conforming to all applicable conditions in selecting a suitable set of data cubes for answering a query.

Furthermore, some data cubes may be eliminated from the identified set of data cubes due to a restriction that the buyer places upon the data cube selection. For example, a user can specify that no data cube whose base pricing exceeds a certain amount be used in executing the query. Accordingly, even if a data cube is not disqualified due to a seller-imposed restriction, the base pricing of the data cube might eliminate the cube from consideration in the query. Again, many other buyer-imposed conditions can limit or expand the set of data cubes that participate in a query, and the same are contemplated within the scope of the illustrative embodiments, with the goal of conforming to all applicable conditions in selecting a suitable set of data cubes for answering a query.

An embodiment determines a set of provenance attributes that are associated with the selected cube. The embodiment determines a result from the query obtained or obtainable from using the cube. The result can be determined without executing the query, upon executing the query, or a combination thereof. The embodiment further determines a confidence level of the result.

An embodiment determines the pricing parameters associated with the provenance attributes in the set of provenance attributes. The embodiment applies any adjustments to the provenance attribute-dependent pricing parameter, if warranted by any changes in the cube or a provenance attribute. The embodiment computes provenance attribute-dependent pricing additions, subtractions, factoring, and adjustments to a base price of the cube. The embodiment presents to the user, the total price for using the cube, the set of provenance attributes, and the confidence level of the result.

Several cubes may be priced in this manner in response to the given query. Thus, given a query, an embodiment computes various provenance-related pricing for the specific contributions of each participating data cubes to the query. An embodiment then allows the user a preview of the query pricing, including, pricing break-down by participating data cubes. The embodiment further allows previewing the confidence level obtained by using the particular portions of the particular cubes and having particular provenance attributes associated therewith.

Even if the query has actually been executed in the background, the embodiment does not provide the result set to the user, so as to prevent a use of the result set without payment. The preview according to an embodiment is sufficient for the user to determine whether the participating data cubes are in fact suitable for the result expected by the user, whether the pricing of one or more data cubes is acceptable to the user, or a combination thereof.

After the preview, the user can commit to pay for the selected data cubes and proceed to execute the query and obtain the result set. Alternatively, if the user finds a confidence level of the result set, a provenance attribute, a pricing of the result set, or a combination thereof, unacceptable, the user can modify the query and repeat the process of an embodiment.

Certain operations are described herein using one or more data cubes, only for the clarity of the description and not as a limitation. Within the scope of the illustrative embodiments, an operation or use described with respect to a data cube can be performed in a similar manner using only a portion of the data cube where the cube allows partial use.

The illustrative embodiments are described with respect to, data formats, queries, data cubes, example pricing definitions, pricing parameters, provenance attributes, metadata, criteria, result sets, confidence levels, previews, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
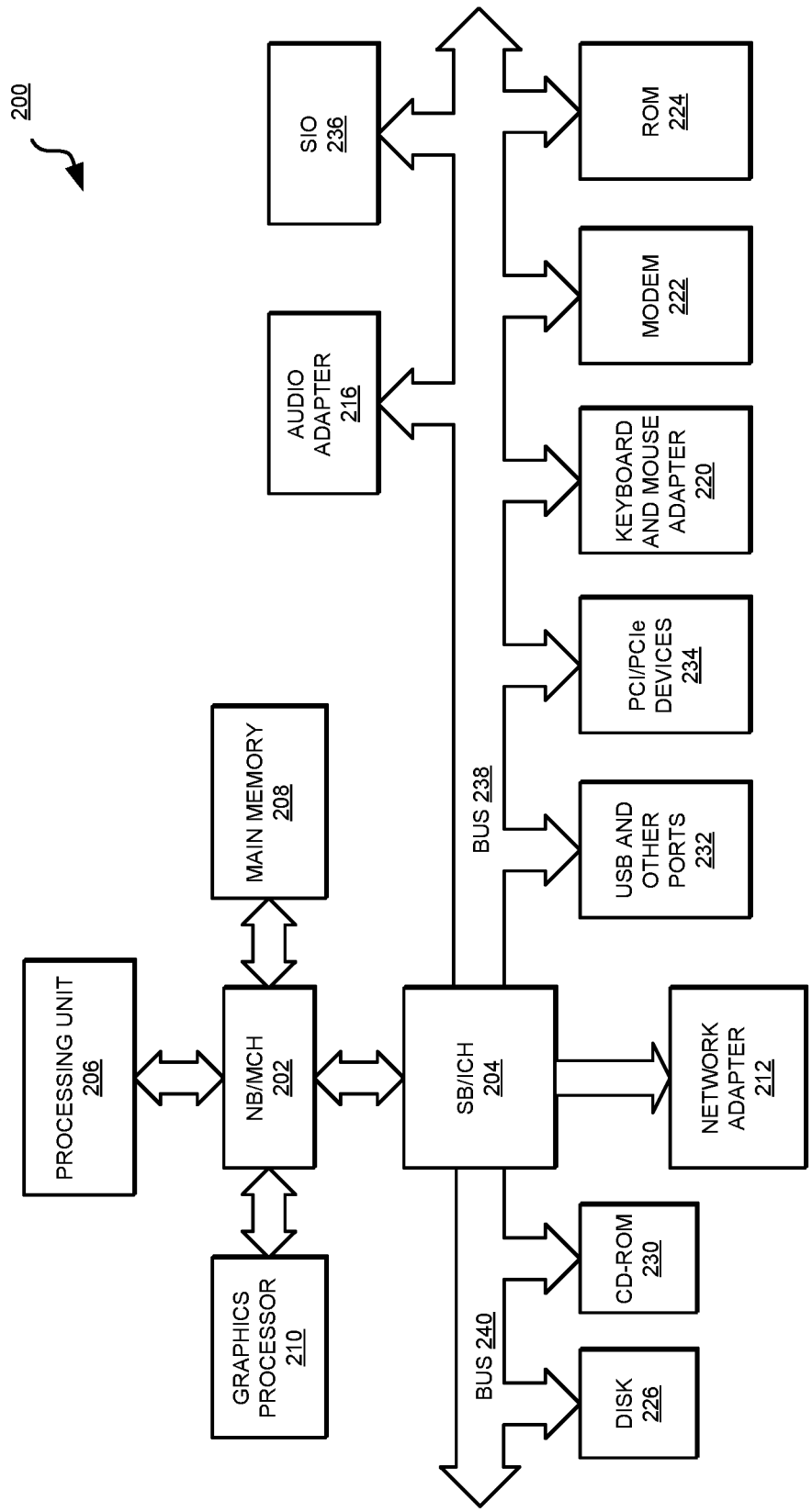
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Application 105 in server 104 implements an embodiment described herein. Data cubes 109 are cubes located in a data store, such as a data store using storage 108. Cube pricing rules 111 include one or more pricing rules for a data cube in data cubes 109. Application 113 in client 112 is an example application using which a user or buyer can build submit a query to application 105. In one embodiment, application 113 is also usable to preview a combination of the query pricing, provenance attributes, and a result set confidence level as described herein. Application 105 selects a set of data cubed from data cubes 109. Application 105 prices the cubes that participate in the query according to a pricing rule in pricing rules 111, as applicable according to a set of provenance attributes associated with the cube's contribution to the query, or a combination thereof.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 and application 113 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
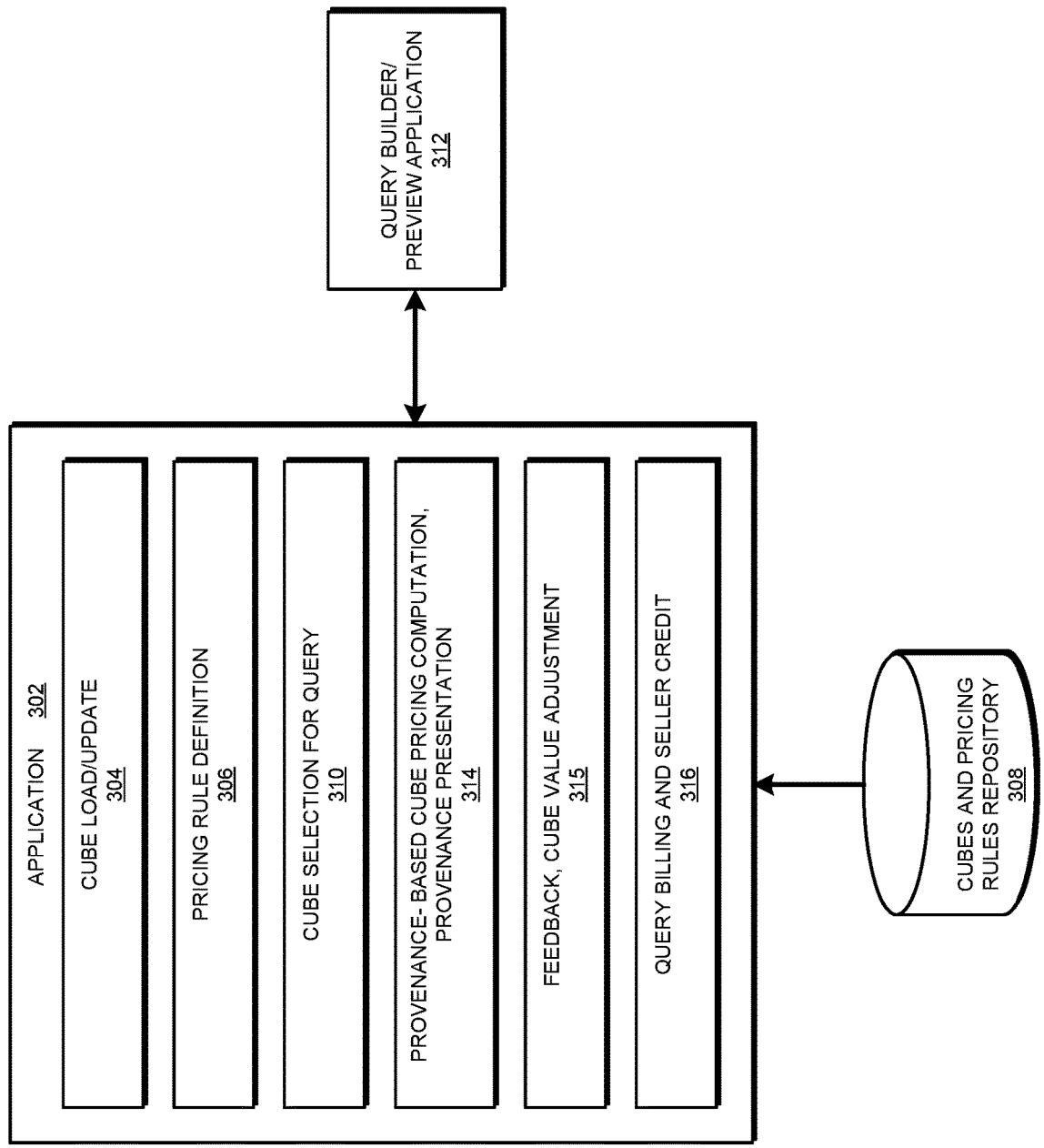
FIG. 3 depicts a block diagram of an application for pricing data according to provenance-based use in a query in accordance with an illustrative embodiment.

With reference to FIG. 3, this figure depicts a block diagram of an application for pricing data according to provenance-based use in a query in accordance with an illustrative embodiment. Application 302 is an example of application 105 in FIG. 1. The configuration of application 302 depicted in FIG. 3 is only an example to describe the various functions of application 302. From this disclosure, those of ordinary skill in the art will be able to implement similar, additional, or different functions in other configurations as well, and the same are contemplated within the scope of the illustrative embodiments.

Component 304 allows a seller to load a data cube into a data store, update an existing cube in the data store, or both. Component 306 allows the seller to define one or more pricing rules for a data cube that the seller loads or updates. As an example, in one embodiment, component 306 presents an interface described with respect to FIG. 4 to enable the pricing rule configuration for a data cube. Some or all pricing rules associated with the data cube can include any number of same or different provenance attribute-related pricing parameters. The data cube from component 304, a set of provenance attributes associated with the data cube, and the one or more pricing rules associated with the data cube are stored in repository 308.

Component 310 interacts with query builder application 312 to receive a query. Query builder 312 is an example of application 113 in FIG. 1. Component 310 selects a set of cubes from repository 308. Each cube in the selected set of cubes can potentially participate in the query.

In one embodiment, component 310 further receives a set of user-specified parameters. For example, the user-specified parameters control how the cubes are selected for executing the query, what pricing restrictions are observed in the selection, and several other aspects of building and executing the query to yield a result set.

Component 314 computes a provenance-based price for using each cube in the query. For each such selected cube, component 314 uses one or more provenance attributes and the corresponding one or more pricing parameters to compute the price for using each selected cube. Component 314 presents those provenance attributes and provenance-based pricing separately for each cube or cumulatively for all cubes to the user in a preview.

Provenance-based pricing can also depend on a confidence level in the result set of the query. In some cases, a result set and the associated level of confidence can be estimated without actually executing the query or a portion thereof against a data cube. In other cases, the result set and the associated level of confidence require executing the query or a portion thereof against a data cube. When possible, component 314 determines a confidence level of the result set and the price of a data cube without executing the query, or a part thereof. When needed, component 314 executes the query, or a part thereof, to determine the confidence level of the result set and the price of a data cube.

Component 314 performs provenance-based pricing computation for the combination of cubes as described elsewhere in this disclosure. As an example, in one embodiment, component 314 presents an interface described with respect to FIG. 5 to enable previewing the query pricing, previewing a set of provenance attributes, previewing the result set confidence level, accepting the selected data cubes and/or provenance attributes for query execution, modifying the query in response to the previewing, or a combination thereof. In one embodiment, the interface is presented using application 312.

In one embodiment, the preview interface presents a set of provenance attributes associated with a selected cube. The user can select a subset of provenance attributes to change which records from the cube participate in the query, and accordingly also the price for using the cube in the query. For example, assume that the set of provenance attributes provided a list of authors. Further assume that the user selected one of those authors. Several authors, including the selected author, may have contributed to one of the selected cubes. Therefore the selection of that author, and not another author, instructs application 302 to select only that portion of a cube in the selection whose content is contributed by the selected author.

In another embodiment, the preview interface presents a set of provenance attributes without associating the set of provenance attributes with any particular cube. When the user selects a provenance attribute from such a set, the user can effectively change the cube selection. For example, assume that the set of provenance attributes provided a list of authors. Further assume that the user selected one of those authors. The selected author may not have contributed to any of the selected cubes and therefore the selection of that author instructs application 302 to replace a cube in the selection with another cube whose content is contributed by the selected author.

In one embodiment, component 310 receives a selection of one or more provenance attributes in the user-specified parameters. Component 310 then replaces, reselects, or otherwise changes the selection of the cubes according to the selected provenance attributes.

Component 316 performs the billing for the data cubes used in executing the query. For example, component 316 bills the user, debits the user's account, credits the accounts associated with the sellers of the used data cubes, or a combination thereof.

Figure 4:
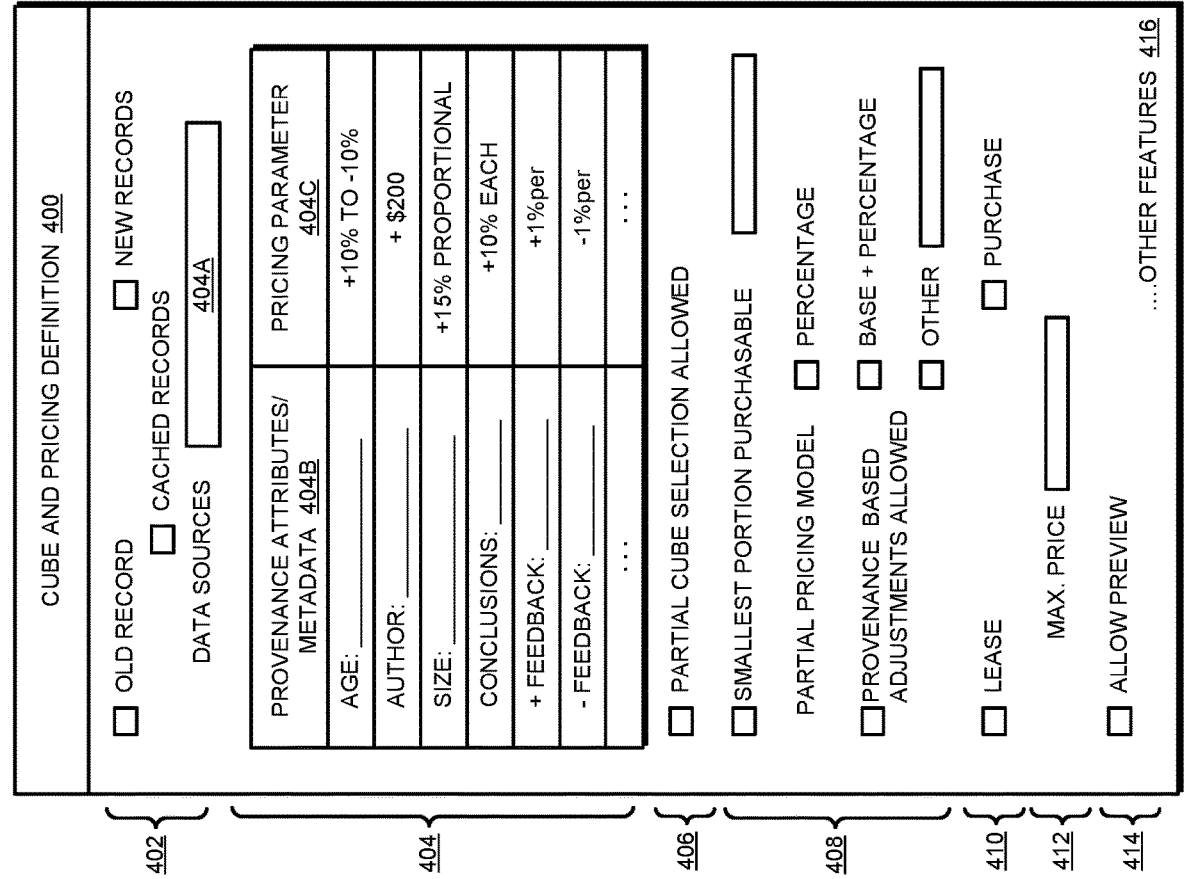
FIG. 4 depicts an example set of sellers' features on an example user interface in accordance with an illustrative embodiment.

With reference to FIG. 4, this figure depicts an example set of sellers' features on an example user interface in accordance with an illustrative embodiment. Interface 400 is presented during the functions of component 304, 306, or both, in FIG. 3. Interface 400, its layout, contents, or types of controls depicted in FIG. 4 are only examples for describing certain features of an embodiment, and are not intended to be limiting on the illustrative embodiments. Other similar features, additional features, or different features will be conceivable from this disclosure and the same are contemplated within the scope of the illustrative embodiments.

In the example depiction, interface 400 provides controls 402 to allow a seller to describe the data cube. For example, using controls 402, a seller specifies whether the cube includes data older than a certain time, data newer than a certain time, data cached from the cube, or a combination thereof. Using controls 402 or additional or different controls (not shown), the seller can also indicate whether the pricing applies to old records in the cube, new records in the cube, cached records of the cube, or a combination thereof.

Control 404 allows the seller to provide information about the provenance of the data in the data cube. Often, a decision whether to use a certain cube in a query depends, at least in part, on the provenance or other information of the source. As an example, using control 404 or additional or different controls (not shown), the seller can provide any type or amount of the provenance information about the data source.

For example, using control 404A, the seller can describe a source of some or all data records in the cube. Using example controls specified under example columns 404B the seller can further specify example provenance attributes such as age of the data in the cube; authorship of the cube; and size or amount of data, or number of records in the cube; one or more conclusions drawn, draw-able, supported, inferred, participated in, or based on the cube. Similarly, the seller can also specify how users have reacted to the data, i.e., by providing positive or negative feedback on the cube. For example, users who have used the cube in their queries previously can provide a feedback as to the utility, accuracy, currency, relevance, or validity of the cube.

Using example controls specified under example columns 404C the seller can further specify example pricing parameters for the corresponding provenance attributes in column 404B. For example, the seller can specify a range of premiums to be applied or deducted depending on how the age of the data in the cube compares to one or more thresholds. As another example, the seller can specify a premium to be applied for the specified authorship of the cube. Similarly, the seller can specify premiums to be applied in proportion to the size or amount of data, or number of records used from the cube in the query. The seller can specify a per instance premium to be applied to each conclusion identified under column 404A. The seller can specify a manner of computing a premiums to be applied or deducted for the positive or negative feedbacks on the cube.

The provenance attributes and manner of specifying them are described and depicted only as examples without implying a limitation thereto. The pricing parameters and manner of specifying them are described and depicted only as examples without implying a limitation thereto. The example provenance attributes and pricing parameters have been chosen to describe a range of types of provenance attributes of a cube and ways to incorporate them into the pricing of the cube. From this disclosure, those of ordinary skill in the art will be able to express these, additional, or different provenance attributes and pricing parameters in these, additional, or different manners and the same are contemplated within the scope of the illustrative embodiments.

Using controls 406, the seller can specify whether the seller will allow only parts of the data cube to be selected for participation in a query. Controls 406 further allow the seller to specify the smallest portion of the data cube that can be sold, leased, traded, or otherwise used with payment in a query. For example, if the cube comprises ten columns, the seller can specify that the smallest portion tradable from the cube is a row or more of all columns, some rows of some columns, or an individual cell.

Controls 408 allow the seller to define one or more pricing rules for the data cube. The seller can define a pricing model of any type, for any portion of the data in the cube, and with any level of detail, with the help of depicted controls and other controls. Any number or type of other controls (not shown for simplifying the figure), can be configured in interface 400 to allow the seller to define selection, participation, and pricing for several portions of the data cube at any level of granularity.

The seller can also choose to allow or disallow, for partial cubes, provenance-based pricing adjustment as described elsewhere in the disclosure. Note that the pricing models depicted in FIG. 4 are only examples to describe a concept, and are not intended to be limiting on the illustrative embodiments.

Controls 410 allow the seller to select the types of trades in which the data cube can participate. For example, some cubes may only be bought, while others may be leased, rented, borrowed, bartered, or otherwise traded for a payment in any suitable manner.

The seller can also specify limits on the pricing of the data cube. For example, controls 412 allow the seller to specify one or more pricing upper limits for the entire cube, different pricing limits for different trading options, different portions, different types of provenance-based adjustments, or a combination of these and several other conditions.

As described elsewhere, an embodiment allows a user to preview the potential query price, result set confidence level from using a particular cube, provenance attributes available for selection, or a combination thereof, before committing to buy or trade for the cube. Control 414 allows a seller to specify whether the cube or a portion thereof can be previewed in this manner without purchasing. By allowing a preview of the cube or a portion thereof, a seller can allow the preview interface to show not only a characteristic of the result set but also even parts of the result set that are contributed by the cube.

Additional controls (not shown) can implement additional or different features 416 in interface 400. For example, additional controls can restrict particular usage of the cube. Many variations of these features, additional details in the depicted example features, additional features, and different features for a similar purpose of offering a seller control over the pricing and usage of their data cubes will be apparent from this disclosure. The same are contemplated within the scope of the illustrative embodiments.

Figure 5:
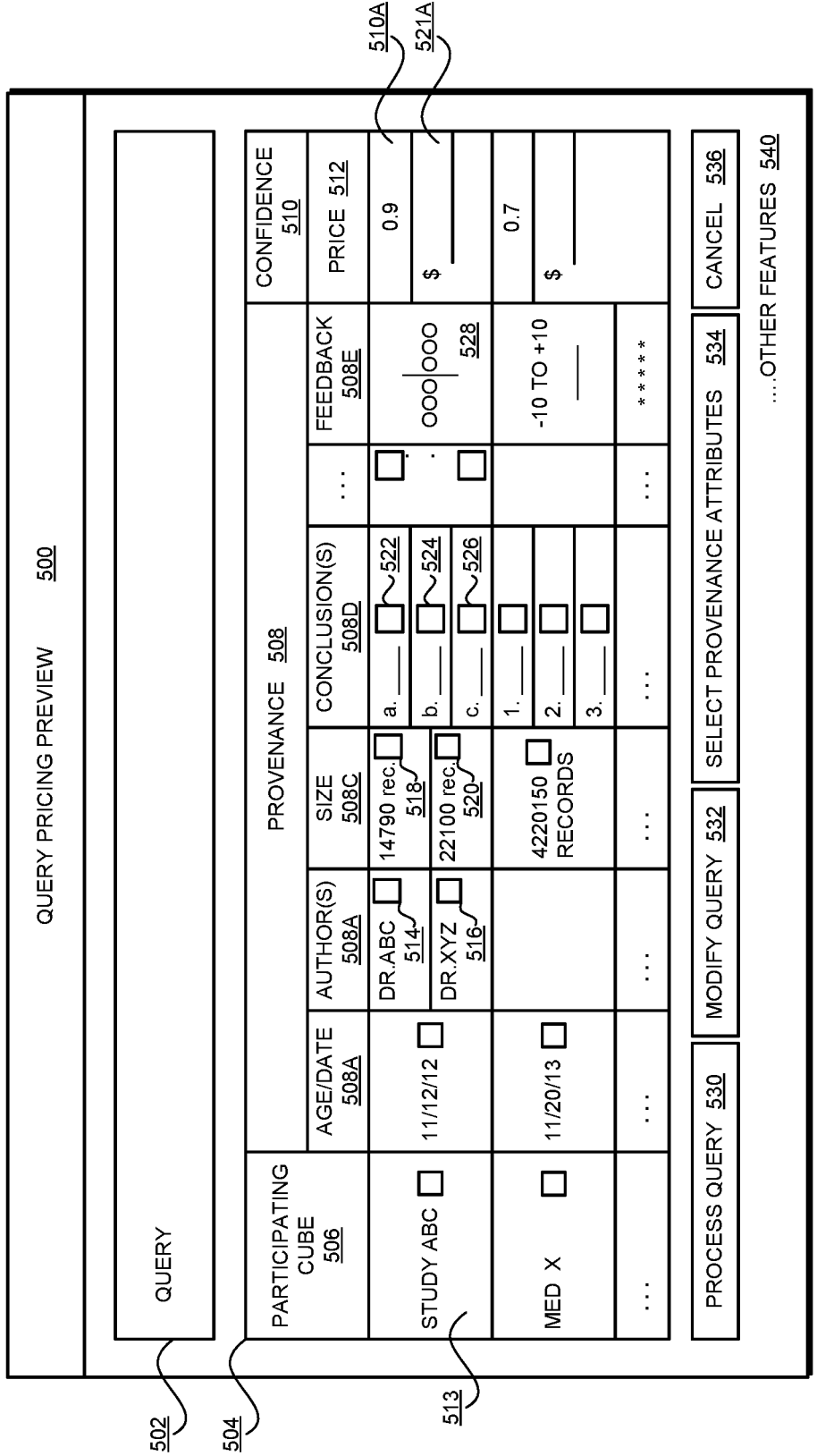
FIG. 5 depicts an example set of preview features on an example user interface in accordance with an illustrative embodiment.

With reference to FIG. 5, this figure depicts an example set of preview features on an example user interface in accordance with an illustrative embodiment. Interface 500 is presented during the functions of component 314 in FIG. 3. Interface 500, its layout, contents, or types of controls depicted in FIG. 5 are only examples for describing certain features of an embodiment, and are not intended to be limiting on the illustrative embodiments. Other similar features, additional features, or different features will be conceivable from this disclosure and the same are contemplated within the scope of the illustrative embodiments.

In the example depiction, interface 500 provides control 502 to allow a user to view or edit the query. For example, using control 502, a user edits a query or a pseudo query in a manner sufficient to identify or change one or more data cubes that can participate to generate a desired result set.

Control 504 allows the user to preview the selected set of cubes for answering the query, one or more provenance attributes selectable for modifying the composition of the selected set, and a confidence level of the result set obtained from the query using the selected set. In the depicted example, control 504 the provenance attributes are depicted in association with the selected set of example cubes only for the clarity of the illustration. Those of ordinary skill in the art will be able to conceive additional or different control 504 to present provenance attributes without associating the provenance attributes with a selected cube, for allowing a user to specify a provenance attribute as a selection criterion for a cube. Such controls are contemplated within the scope of the illustrative embodiments.

As depicted, control 504 lists participating cubes, to wit, the selected set of cubes to answer the query, in column 506. Column 508 depicts a set of provenance attributes that can help the user in refining, reducing, or reconstituting the selected set of cubes. Column 508A presents example provenance attribute describing the age or date of the data of a cube. Column 508B presents example provenance attribute describing the author(s) of the data of a cube. Column 508C presents example provenance attribute describing the size of the data of a cube. Column 508D presents example provenance attribute describing one or more conclusions from the data of a cube. Column 508A presents example provenance attribute describing the users' feedback about the data of a cube. Any number and types of provenance attributes can be similarly presented in control 504.

Confidence values 510 are presented corresponding to the contribution of specific selected cube. Cube pricing 512 represents the provenance-based price for using a specific selected cube.

As an example, assume that selected cube 513 is the cube "study XYZ". Using cube 513, the result set of an example query achieves confidence rating 510A of ninety percent, or 0.9. For confidence rating 510A, the price for using cube 513 is presented as 512A.

The user can select one of controls 514 and 516, to restrict the contributing authors, thereby selecting only that portion of cube 513 that is authored by the selected author. Similarly, the user can select one of controls 518 and 520, to restrict the groups of records, thereby selecting only a portion of cube 513 that corresponds to the selected group. The user can select one of controls 522, 524, and 526, to restrict the cube by conclusions, thereby selecting only that portion of cube 513 that contributed to the selected conclusion.

The user can use control 528 to provide a feedback as to selected cube 513. The feedback is usable for adjusting a pricing parameter of cube 513 as described elsewhere in this disclosure.

Of course, the user can select more than one controls, associated with more than one type of provenance attribute, to form sophisticated selections of cubes or portions thereof. Depending on which controls are selected by the user, confidence value 510A, cube pricing 512A, or both can also change. Thus, control 504 allows a user to fine-tune a set of cubes used for answering a query according to the user's confidence level expectations, pricing expectations, provenance expectations, or a combination thereof.

Control 530 is usable to indicate that the user is satisfied with the preview and the application, such as application 302 in FIG. 3, may proceed to execute the query using the set of cubes used in the preview. Control 532 is usable to indicate that the user is not satisfied with the preview and wishes to modify the query. The application, such as application 302 in FIG. 3, can then evaluate the contributions of a revised set of data cubes towards the modified query in a similar manner and present a revised preview.

Control 534 is usable to indicate that the user is wishes to modify the cube selection according to the provenance attributes selected in control 504. The application, such as application 302 in FIG. 3, can then evaluate the contributions of a revised set of data cubes towards the query in a similar manner and present a revised preview. Control 536 allows the user to abandon the query and exit the preview without committing to buying or trading any data cube.

Additional controls (not shown) can implement additional or different features 540 in interface 500. Many variations of the depicted example features, additional details in the depicted example features, additional features, and different features for a similar purpose of offering a user control over the provenance, confidence level, and pricing of data cubes will be apparent from this disclosure. The same are contemplated within the scope of the illustrative embodiments.

None of the features described in FIGS. 4 and 5 are necessary for the operation an embodiment. For example, an embodiment can use defined values from profiles, default values in an environment, machine learning based learned preferences, and other ways for configuring similar features, and the same are contemplated within the scope of the illustrative embodiments.

Figure 6:
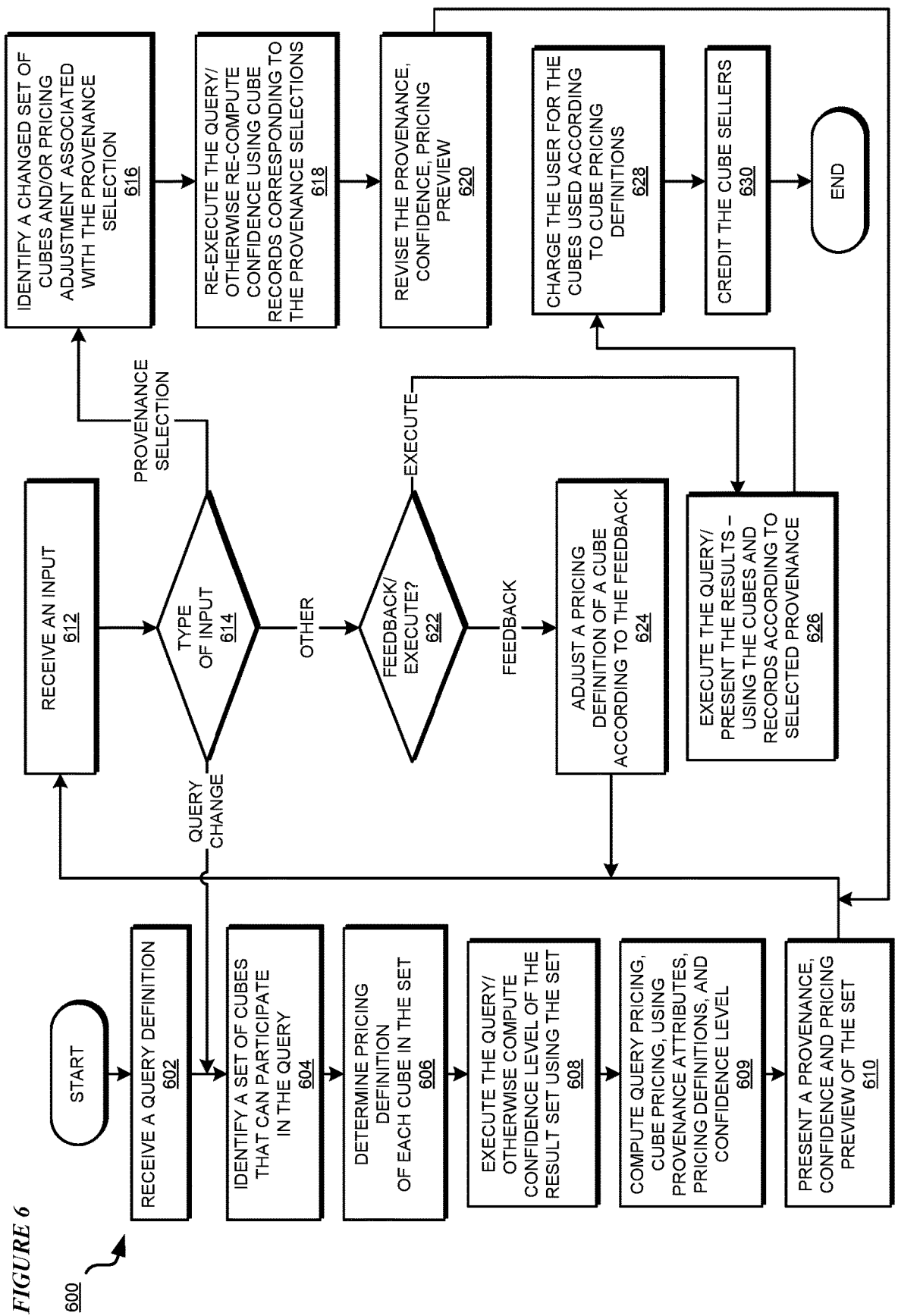
FIG. 6 depicts a flowchart of an example process for pricing data according to provenance-based use in a query in accordance with an illustrative embodiment.

With reference to FIG. 6, this figure depicts a flowchart of an example process for pricing data according to provenance-based use in a query in accordance with an illustrative embodiment. Process 600 can be implemented in application 302 in FIG. 3.

The application receives a query definition (block 602). The application identifies a set of data cubes that can participate in the query (block 604). The application determines one or more pricing definitions or rules applicable to each data cube in the identified set of cubes (block 606).

The application determines a confidence level of the result set of the query when the selected set of cubes is used to answer the query (block 608). Depending on the query and the selected set of cubes, in some cases, the application can determine the confidence level of block 608 without executing the query, or a portion thereof, whereas in other cases, the application has to execute at least a portion of the query using at least a subset of the selected set of cubes to determine the confidence level.

The application computes the price for answering the query using the selected set of cubes, including the price for each participating cube based on the provenance attributes of the cube, pricing definitions applicable to the cube and its provenance attributes, and the contribution of the cube to the confidence level (block 609). The application presents a preview of the provenance attributes, confidence level, query pricing, and cube pricing in a preview interface (block 610).

The application receives an input (block 612). The application determines a type of the input (block 614). If the input changes or modifies the query ("Query change" path of block 614), the application returns process 600 to block 604.

If the input is to select or adjust a provenance attribute ("Provenance selection" path of block 614, the application identifies a changed set of cubes and/or a pricing adjustment for a cube (block 616). The application recomputes a confidence level of a revised result set according to the provenance attribute selection (bock 618). The application revises the price for answering the query using the selected set of cubes, including the price for each participating cube based on the adjusted provenance attributes of the cube, pricing definitions applicable to the cube and its provenance attributes, and the contribution of the cube to the revised confidence level (block 620). The application returns process 600 to block 612.

If the input is of another type ("Other" path of block 614), the application determines whether the input is to execute the query or to provide a feedback on a cube (block 622). If the input provides feedback ("Feedback" path of block 622), the application adjusts a pricing definition of a cube according to the feedback (block 624). The application returns to block 612.

If the input is to execute the query ("Execute" path of block 622), the application executes the query using the selected set of cubes (block 626). If the query or a part thereof has already been executed in block 609 or 618, an embodiment can entirely or partially omit block 626 and thereafter proceed to block 630.

The application charges the user for the used cubes according to the cube pricing definitions of those cubes (block 628). The application credits the sellers of the used cubes according to the usage (block 630). The application ends process 600 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for pricing data according to provenance-based use in a query.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for pricing data according to provenance-based use in a query, the method comprising:
    identifying, by a processor, a set of data cubes, wherein a data cube in the set of data cubes comprises a quantum of data configured for trading in exchange for a payment, the set of data cubes being identified to participate in answering the query;
    computing, by the processor, a first portion of a price for performing the query, wherein the first portion includes a price of a first data cube computed using a first set of provenance attributes and a first provenance-based pricing adjustment from a first pricing definition, the first data cube being included in the set of data cubes;
    computing, by the processor, a confidence level of a result set of the query, the confidence level determined without executing the query; and
    presenting, by the processor, the set of data cubes, the first set of provenance attributes, the first portion of the price, and the confidence level in a pricing preview of the query, the pricing preview excluding at least a portion of data from the result set of the query;
    receiving an input;
        presenting the result set responsive to the input allowing execution of the query using the set of data cubes, the result set resulting from executing the query using the set of data cubes; and
        debiting an account for the price, and
    crediting a seller of the first data cube the first portion.

2. The method of claim 1, further comprising:
receiving an input, wherein the input changes a selection of a provenance attribute in the first set of provenance attributes, forming a revised first set of provenance attributes; and
changing, responsive to the input, the first data cube such that a portion of the first data cube participates in the set of data cubes, forming a revised set of data cubes.

3. The method of claim 2, further comprising:
computing a revised first portion of the price for performing the query, wherein the revised first portion includes a price of the portion of the first data cube computed using the revised set of provenance attributes and a second provenance-based pricing adjustment;
computing a revised confidence level of a revised result set of the query; and
presenting the revised set of data cubes, the revised first set of provenance attributes, the revised first portion of the price, and the revised confidence level in the pricing preview of the query.

4. The method of claim 1, further comprising:
receiving an input, wherein the input changes a selection of a provenance attribute in the first set of provenance attributes, forming a second set of provenance attributes; and
adding, responsive to the input, a second data cube to the set of data cubes, forming a second set of data cubes.

5. The method of claim 4, further comprising:
computing a second portion of the price for performing the query, wherein the second portion includes a price of the second data cube computed using the second set of provenance attributes and a second provenance-based pricing adjustment;
computing a second confidence level of a second result set of the query; and
presenting the second set of data cubes, the second set of provenance attributes, the second portion of the price, and the second confidence level in the pricing preview of the query.

6. The method of claim 1, further comprising:
receiving an input, wherein the input provides a feedback on the first data cube;
changing, responsive to the input, a provenance attribute in the first set of provenance attributes; and
changing a second provenance-based pricing adjustment for the first data cube.

7. The method of claim 1, further comprising:
computing a contribution of the first data cube in the confidence level; and
computing a second provenance-based pricing adjustment from a second pricing definition, wherein the price of the first data cube is further computed using the second provenance-based pricing adjustment.

8. The method of claim 1, further comprising:
evaluating whether the first portion can be computed without executing the query, and wherein the first portion is computed responsive to the evaluating being affirmative.

9. The method of claim 1, further comprising:
estimating the result set by executing a portion of the query using a subset of the set data cubes, wherein the first data cube is included in the subset of the set of data cubes.

10. A computer program product for pricing data according to provenance-based use in a query, the computer program product comprising:
one or more computer-readable tangible storage devices;
program instructions, stored on at least one of the one or more storage devices, to identify a set of data cubes, wherein a data cube in the set of data cubes comprises a quantum of data configured for trading in exchange for a payment, the set of data cubes being identified to participate in answering the query;
program instructions, stored on at least one of the one or more storage devices, to compute a first portion of a price for performing the query, wherein the first portion includes a price of a first data cube computed using a first set of provenance attributes and a first provenance-based pricing adjustment from a first pricing definition, the first data cube being included in the set of data cubes;
program instructions, stored on at least one of the one or more storage devices, to compute a confidence level of a result set of the query, the confidence level determined without executing the query; and
program instructions, stored on at least one of the one or more storage devices, to present the set of data cubes, the first set of provenance attributes, the first portion of the price, and the confidence level in a pricing preview of the query, the pricing preview excluding at least a portion of data from the result set of the query;
program instructions, stored on at least one of the one or more storage devices, to receive an input;
program instructions, stored on at least one of the one or more storage devices, to present the result set responsive to the input allowing execution of the query using the set of data cubes, the result set resulting from executing the query using the set of data cubes; and
program instructions, stored on at least one of the one or more storage devices, to debit an account for the price, and
program instructions, stored on at least one of the one or more storage devices, to credit a seller of the first data cube the first portion.

11. The computer program product of claim 10, further comprising:
program instructions, stored on at least one of the one or more storage devices, to receive an input, wherein the input changes a selection of a provenance attribute in the first set of provenance attributes, forming a revised first set of provenance attributes; and
program instructions, stored on at least one of the one or more storage devices, to change, responsive to the input, the first data cube such that a portion of the first data cube participates in the set of data cubes, forming a revised set of data cubes.

12. The computer program product of claim 11, further comprising:
program instructions, stored on at least one of the one or more storage devices, to compute a revised first portion of the price for performing the query, wherein the revised first portion includes a price of the portion of the first data cube computed using the revised set of provenance attributes and a second provenance-based pricing adjustment;
program instructions, stored on at least one of the one or more storage devices, to compute a revised confidence level of a revised result set of the query; and
program instructions, stored on at least one of the one or more storage devices, to present the revised set of data cubes, the revised first set of provenance attributes, the revised first portion of the price, and the revised confidence level in the pricing preview of the query.

13. The computer program product of claim 10, further comprising:
 program instructions, stored on at least one of the one or more storage devices, to receive an input, wherein the input changes a selection of a provenance attribute in the first set of provenance attributes, forming a second set of provenance attributes; and
 program instructions, stored on at least one of the one or more storage devices, to add, responsive to the input, a second data cube to the set of data cubes, forming a second set of data cubes.

14. The computer program product of claim 13, further comprising:
 program instructions, stored on at least one of the one or more storage devices, to compute a second portion of the price for performing the query, wherein the second portion includes a price of the second data cube computed using the second set of provenance attributes and a second provenance-based pricing adjustment;
 program instructions, stored on at least one of the one or more storage devices, to compute a second confidence level of a second result set of the query; and
 program instructions, stored on at least one of the one or more storage devices, to present the second set of data cubes, the second set of provenance attributes, the second portion of the price, and the second confidence level in the pricing preview of the query.

15. The computer program product of claim 10, further comprising:
 program instructions, stored on at least one of the one or more storage devices, to receive an input, wherein the input provides a feedback on the first data cube;
 program instructions, stored on at least one of the one or more storage devices, to change, responsive to the input, a provenance attribute in the first set of provenance attributes; and
 program instructions, stored on at least one of the one or more storage devices, to change a second provenance-based pricing adjustment for the first data cube.

16. The computer program product of claim 10, further comprising:
 program instructions, stored on at least one of the one or more storage devices, to compute a contribution of the first data cube in the confidence level; and
 program instructions, stored on at least one of the one or more storage devices, to compute a second provenance-based pricing adjustment from a second pricing definition, wherein the price of the first data cube is further computed using the second provenance-based pricing adjustment.

17. A computer system for pricing data according to provenance-based use in a query, the computer system comprising:
 one or more processors, one or more computer-readable memories and one or more computer-readable tangible storage devices;
 program instructions, stored on at least one of the one or more storage devices for execution by at least one of the one or more processors via at least one of the one or more memories, to identify a set of data cubes, wherein a data cube in the set of data cubes comprises a quantum of data configured for trading in exchange for a payment, the set of data cubes being identified to participate in answering the query;
 program instructions, stored on at least one of the one or more storage devices for execution by at least one of the one or more processors via at least one of the one or more memories, to compute a first portion of a price for performing the query, wherein the first portion includes a price of a first data cube computed using a first set of provenance attributes and a first provenance-based pricing adjustment from a first pricing definition, the first data cube being included in the set of data cubes;
 program instructions, stored on at least one of the one or more storage devices for execution by at least one of the one or more processors via at least one of the one or more memories, to compute a confidence level of a result set of the query, the confidence level determined without executing the query; and
 program instructions, stored on at least one of the one or more storage devices for execution by at least one of the one or more processors via at least one of the one or more memories, to present the set of data cubes, the first set of provenance attributes, the first portion of the price, and the confidence level in a pricing preview of the query, the pricing preview excluding at least a portion of data from the result set of the query;
 program instructions, stored on at least one of the one or more storage devices for execution by at least one of the one or more processors via at least one of the one or more memories, to receive an input;
 program instructions, stored on at least one of the one or more storage devices for execution by at least one of the one or more processors via at least one of the one or more memories, to present the result set responsive to the input allowing execution of the query using the set of data cubes, the result set resulting from executing the query using the set of data cubes; and
 program instructions, stored on at least one of the one or more storage devices for execution by at least one of the one or more processors via at least one of the one or more memories, to debit an account for the price, and
 program instructions, stored on at least one of the one or more storage devices for execution by at least one of the one or more processors via at least one of the one or more memories, to credit a seller of the first data cube the first portion.

* * * * *